United States Patent [19]

Ellis

[11] Patent Number: 5,863,047
[45] Date of Patent: Jan. 26, 1999

[54] MECHANICAL SEAL ASSEMBLY

[75] Inventor: Peterjon Ellis, Lower Gwynedd, Pa.

[73] Assignee: Utex Industries, Inc., Houston, Tex.

[21] Appl. No.: 787,277

[22] Filed: Jan. 24, 1997

[51] Int. Cl.[6] ........................................... F16J 15/34
[52] U.S. Cl. .......................................... 277/374; 277/377
[58] Field of Search .................................. 277/370, 385, 277/374, 358, 377, 371

[56] References Cited

U.S. PATENT DOCUMENTS

| | | | |
|---|---|---|---|
| 4,583,748 | 4/1986 | Weichenrieder | 277/385 |
| 4,795,572 | 1/1989 | LaValley | 277/385 |
| 5,116,066 | 5/1992 | Crawford . | |
| 5,209,496 | 5/1993 | Azibert et al. . | |
| 5,662,340 | 9/1997 | Bessette et al. | 277/374 |

OTHER PUBLICATIONS

Dura Seal Manual: Prior art mechanical seal design.
Dura Seal Manual: Prior art mechanical seal design, Section IV, p. 7.
Chesterton 155 Cartridge Single Seal advertisement.
Chesterton 156 Heavy Duty Slurry Seal advertisement.
In-Series Design for Maximum Reliability in Sealing VOC's and VHAP's advertisement.
Chesterton 442 Split Mechanical Seal advertisement.

*Primary Examiner*—Anthony Knight
*Assistant Examiner*—Gary Grafel
*Attorney, Agent, or Firm*—Browning Bushman

[57] ABSTRACT

A mechanical seal assembly having multiple compression spring assemblies that are used to bias a stationary seal into sealing engagement with a rotating seal, the springs in the spring assemblies being supported on their internal diameter and having their outside diameter visible for their entire length, each spring assembly further including a releasable, expendable clip that serves to preload the two seal faces against one another, limits relative axial movement between the stationary and rotating seal assemblies, and coaxially aligns the stationary and rotating seal assemblies.

13 Claims, 2 Drawing Sheets

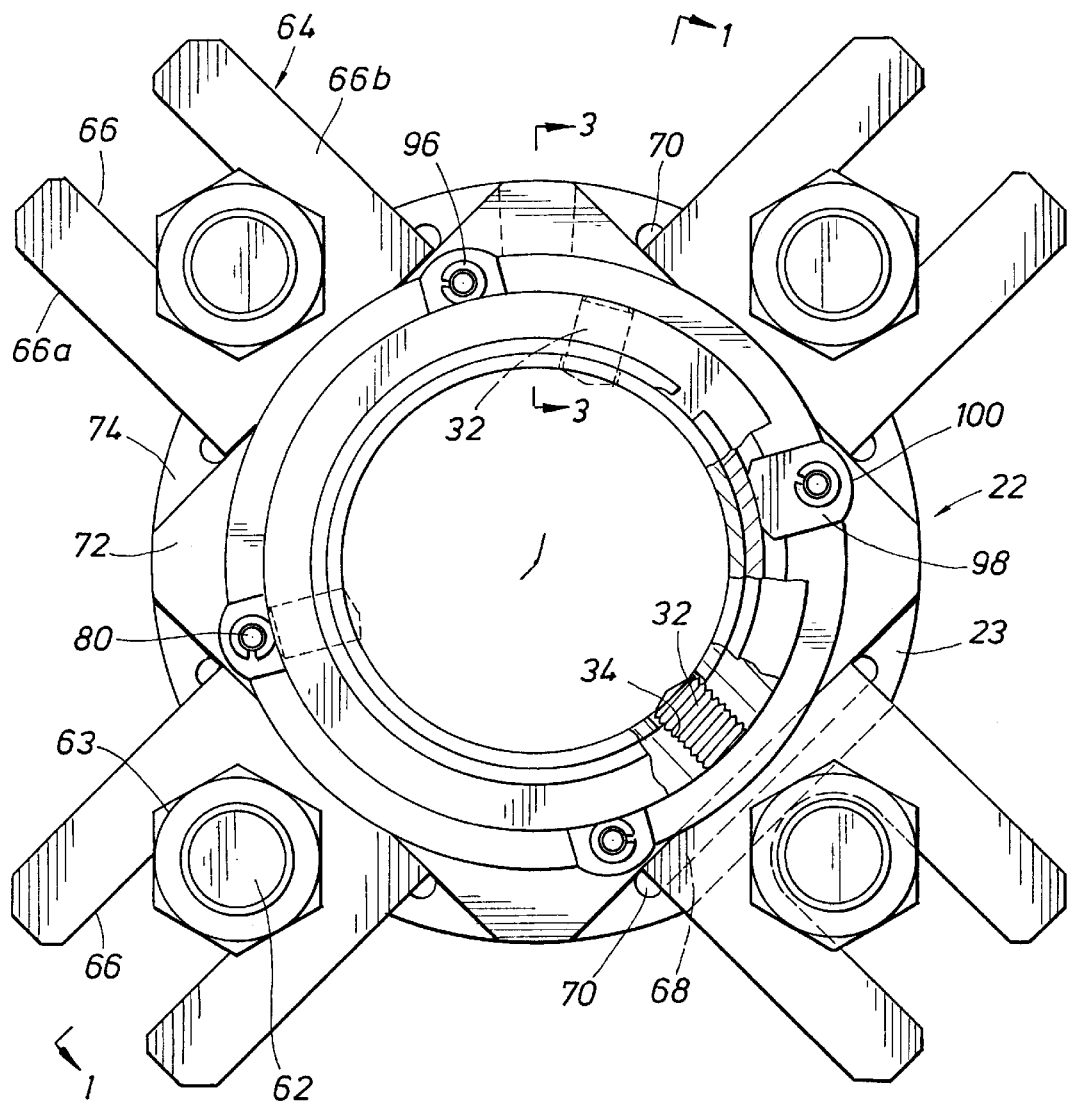
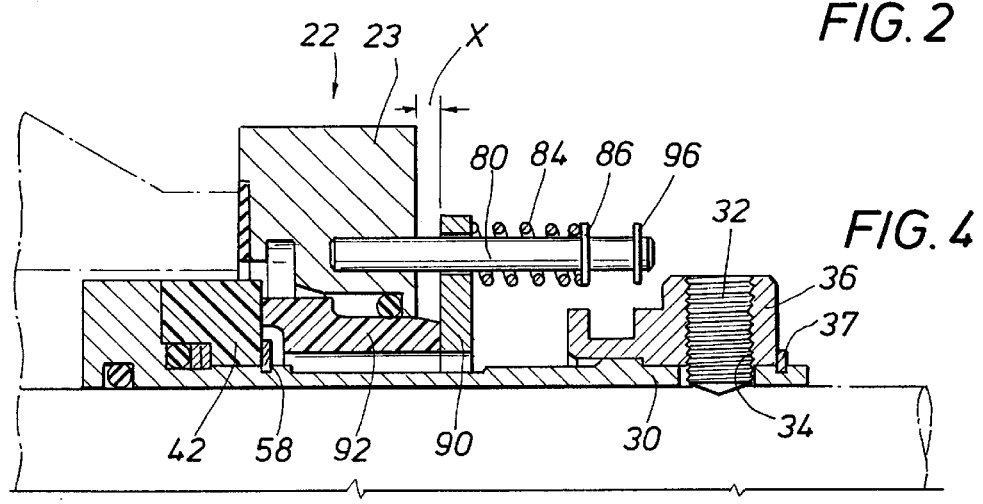

MECHANICAL SEAL ASSEMBLY

BACKGROUND OF THE INVENTION

1. Field of the Invention

The present invention relates to mechanical seals and, more particularly, to a mechanical seal assembly of a cartridge type having means for maintaining alignment and preloading between the stationary and rotating portions of the seal assembly.

2. Description of the Background

Numerous different mechanical seals have been proposed to effect sealing around a shaft to prevent leakage of both sealing fluid and operating fluid from an enclosure from which the shaft extends. While mechanical seals employing a single biasing spring coil are known, typically, where high speeds are involved, multiple, small coil springs are used, the coil springs being circumferentially spaced around the rotary unit. Both compression springs and tension springs have been used as means to bias the rotating and stationary seal faces together.

To the extent known by the Applicant, in a case where the springs are used to bias the stationary seal member, and particularly where the springs are mounted externally of the process fluid, the springs are supported on their outside diameter, usually contained in pockets in a separate spring housing or the like that attaches to the main housing or gland of the seal, or in the main housing itself.

Mechanical seal designs employing compression springs that are supported on their outside diameter, e.g., in spring pockets in the main or a separate spring housing, frequently encounter problems because of clogging sources such as coking, oxidation, salts from fluids that crystallize, contaminants from slurries, etc. This clogging restricts the springs' ability to provide axial closing force to the seal face. Additionally, mechanical seals wherein the springs are located internally, i.e., in an area where they are contacted by any corrosive fluid (process fluid) that leaks past the seal, are subject to stress corrosion cracking.

In addition to avoiding the clogging and corrosion problems discussed above with respect to many prior art mechanical seal designs, it is also desirable that the biasing springs be subject to complete visual inspection while in service. If the springs are located in spring pockets or separate spring housings or disposed directly behind the seal element being biased, this becomes virtually impossible.

Accordingly, there remains a need for a mechanical seal design employing compression springs, especially compression springs that act to bias the stationary seal element against the rotating seal element, that are supported on their inside diameters, that are not subject to clogging, that are located externally of the process fluid environment so as to be removed from corrosive environments, and that are subject to complete visual inspection.

It is common in integrated or cartridge-type mechanical seal designs, for ease of installation, to employ some sort of setting clips that basically hold the rotary and stationary components together while the seal is installed to minimize installation time and misalignment of components. Many existing designs utilize setting clips that are rigidly secured to the various seal parts using screws or other fasteners. Obviously, these clip types with their fasteners must be repositioned or removed prior to operation of the seal. There are yet other designs that utilize removable, flexible setting straps or a setting means made of a wearable material, the latter not requiring removal.

It would clearly be desirable to have a cartridge-type assembly that utilizes wearable setting clips and therefore is easily installed, that holds the components of the seal assembly together in both axial directions along the shaft and concentrically positions the rotary parts relative to the stationary parts prior to and during installation, and that need not be repositioned or removed prior to operation of the mechanical seal.

Mechanical seals of the type under consideration include a gland assembly that is used to secure and seal the mechanical seal assembly to the housing through which the shaft extends. For example, in a typical use of a mechanical seal to effect sealing of a pump shaft, the gland is positioned around the pump shaft and secured by bolts to the pump housing. Typically, this is accomplished by means of threaded bolts that are received in threaded bores in the pump housing and extend through suitable apertures in the gland body or in tabs or lugs carried by the gland body of the mechanical seal. When the tabs or lugs are monolithic with the gland or must be installed as part of the gland, difficulty is often encountered because of tight spacing. Accordingly, it would clearly be desirable to have a gland assembly for use with a mechanical seal, which would allow the gland assembly to be positioned on the shaft and have removable tabs or lugs, which, once the gland is positioned on the shaft, can be easily affixed to the gland, following which the tabs or lugs can be used to secure the gland to the housing as described above.

SUMMARY OF THE INVENTION

It is therefore an object of the present invention to provide an improved mechanical seal assembly.

Yet another object of the present invention is to provide an improved mechanical seal assembly of the cartridge type that employs externally mounted biasing springs.

A further object of the present invention is to provide a mechanical seal assembly that uses biasing springs that are resistant to clogging.

A further object of the present invention is to provide a mechanical seal assembly using compression springs that are supported on their inside diameter so as to permit complete visual inspection of the spring.

Still a further object of the present invention is to provide a cartridge-type mechanical seal assembly that utilizes wearable, temporary setting clips that act to hold the components of the seal assembly together in both axial directions along the shaft and concentrically position the rotary parts relative to the stationary parts of the seal.

It is yet another object of the present invention to provide a gland assembly for use with a mechanical seal that uses removable tabs or lugs to secure the gland of the mechanical seal to the housing of the machine shaft being sealed.

The above and other objects of the present invention will become apparent from the drawings, the description given herein, and the appended claims.

In one aspect, the mechanical seal of the present invention, which is used to effect sealing between a rotatable shaft and a wall through which the shaft extends and rotates relative thereto, comprises an annular sleeve for securing to the shaft. A first annular seal element is carried by the sleeve and rotates therewith in response to rotation of the shaft, the first seal element having a first seal face. An annular housing or gland is provided for securing to the wall, and a second, annular seal element is interconnected to the housing and has a second seal face engageable with the first seal face.

The seal assembly further includes a plurality of compression spring assemblies for biasing the second, stationary seal towards the first seal. Each of the compression spring assemblies includes a pin member attached to the housing, the pin member being disposed generally parallel to the sleeve, there being provided a stop member carried by the pin member and located distal the housing. The compression spring assembly further includes a compression ring having a first side operatively engageable with the second seal element and an opposite, second side. The spring assemblies also include a compression spring disposed in surrounding relationship to the pin member, i.e., supported on the inside diameter, and compressed between the second side of the compression spring and the stop member such that the compression spring serves to bias the second seal element against the first seal element. The compression ring is unsupported on its outside diameter for its entire length and thereby is readily susceptible to visual inspection.

In yet another embodiment of the present invention, the mechanical seal comprises a rotating seal assembly including an annular sleeve for securing to the shaft and a first annular seal element carried by the sleeve and rotatable therewith in response to rotation of the shaft, the first seal element having a first seal face. The mechanical seal further includes a stationary seal assembly comprising an annular housing or gland for securing to the wall of the machine housing through which a shaft extends, a second annular seal element interconnected to the housing and having a second seal face engageable with the first seal face, biasing means for urging at least one of the first or second seal elements towards the other of the first or second seal elements whereby the first and second seal faces are sealingly engaged. There is also provided selectively releasable means interconnecting the rotating seal assembly and the stationary seal assembly to restrain relative axial movement between the rotating and stationary seal assemblies prior to securing the housing to said wall and to effect a preload of the biasing means.

In another aspect of the present invention, there is provided a gland assembly for use in mounting a mechanical seal about a machine shaft to the wall of a machine housing through which the shaft extends using a plurality of bolts at fixed bolt positions in the wall. The gland assembly includes a gland body having a first side that forms a mounting surface for engagement with the wall of the housing and a second side that has a plurality of lug engaging formations, each of the lug engaging formations being characterized by a substantially straight slot formed in the second side of the gland body adjacent to the periphery thereof. The gland assembly further includes a lug member that has a first section defining a bolt receiving aperture and a second section defining a tab, the first and second sections cooperating to form a recess, the tab being dimensioned so as to be removably receivable in the slot.

BRIEF DESCRIPTION OF THE DRAWING

The invention can be best understood by reference to the attached drawings in which:

FIG. 2 is an elevational, end view of the mechanical seal assembly shown in FIG. 1;

FIG. 4 is a partial, elevational, sectional view similar to FIG. 1 but showing the retaining clips worn or broken away.

DESCRIPTION OF THE PREFERRED EMBODIMENT

Figures 1, 3:
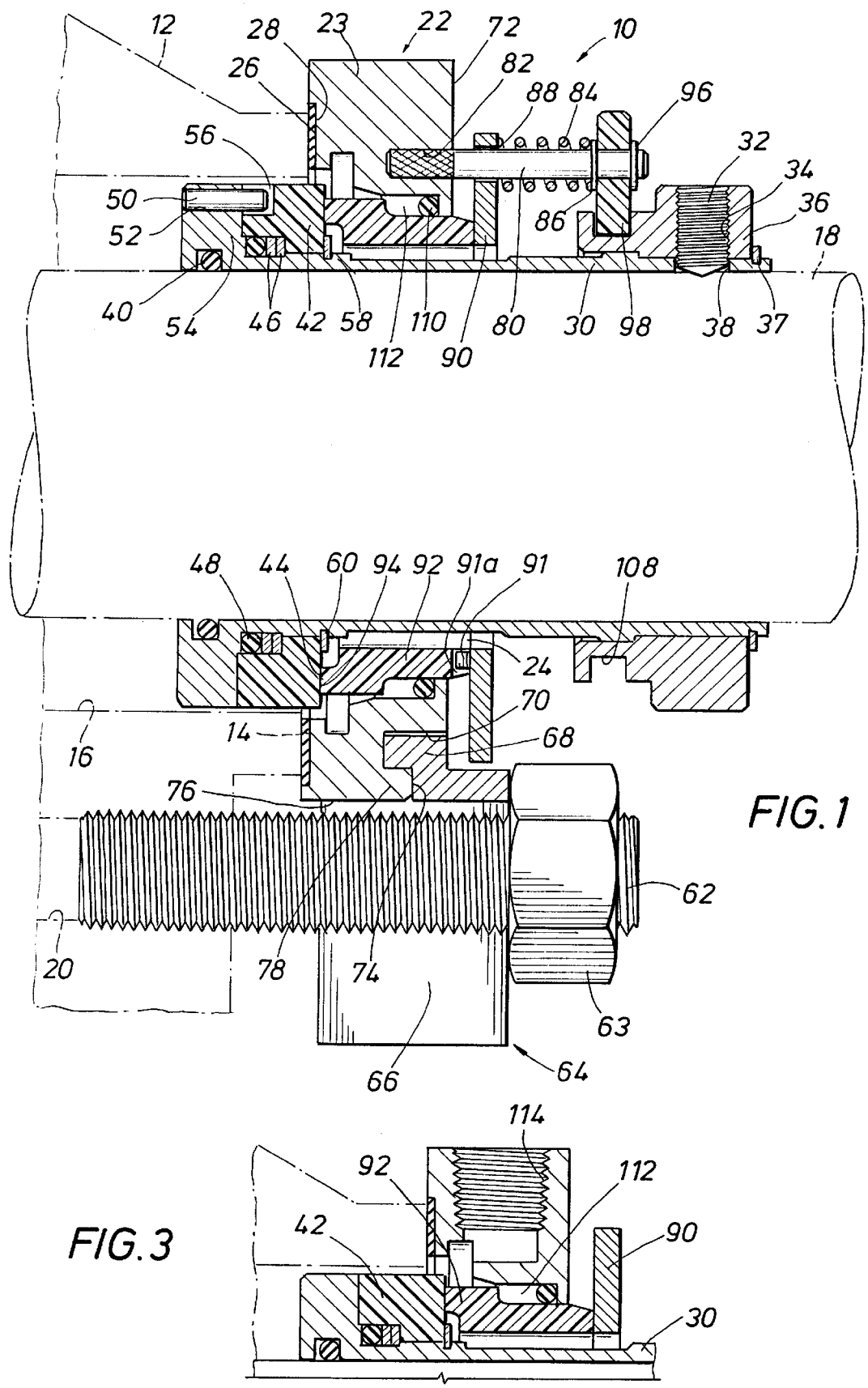
FIG. 1 is an elevational, sectional view showing the mechanical seal assembly of the present invention and taken along the lines 1—1 of FIG. 2.
FIG. 3 is a partial sectional view taken along the lines 3—3 of FIG. 2.

With reference first to FIG. 1, the mechanical seal assembly, shown generally as 10, is shown attached (in a manner hereinafter described) to a machine housing 12 having a wall 14 defining a bore 16 through which a shaft 18 extends, the shaft 18 being rotatable relative to the housing 12. It will be appreciated that housing 12 can be a pump housing or a housing for any other type of machine utilizing a rotatable shaft wherein sealing is required between the housing and the shaft. Housing 12 is also provided with a series of threaded bores 20 for mounting mechanical seal assembly 10 thereto, as will be described hereafter.

Seal assembly 10 comprises a gland assembly, shown generally as 22, that has a gland body 23 that is generally annular and defines a bore 24 therethrough through which shaft 18 extends. An annular gasket 26 received in an annular counter bore 28 in one side wall of gland body 23 serves to effect a fluid tight seal between housing 12 and gland body 23 when gland body 23 is secured to housing 12.

As is conventional, the mechanical seal assembly of the present invention comprises a rotating assembly and a stationary assembly. With reference first to the rotating assembly, a sleeve 30, in surrounding relationship to shaft 18, is secured to shaft 18 for rotation therewith by means of a set screw 32 extending through a threaded bore 34 in an annular collar 36 that is disposed in surrounding relationship to sleeve 30. As best seen in FIG. 1, bore 34 is in register with a bore 38 in sleeve 30 whereby set screw 32 locks collar 36 to sleeve 30, both assemblies being locked to shaft 18 for rotation therewith by means of set screw 32. Sealing between sleeve 30 and shaft 18 is effected by an O-ring seal 40.

Received in surrounding relationship to sleeve 30 is a first, annular rotating seal element 42 defining a first sealing face 44. First seal element 42, which can be made from a variety of materials well known to those skilled in the art and commonly used in mechanical seal assemblies, is sealed against sleeve 30 by means of packing rings 46 and O-ring seal 48. At least one, and preferably two, drive pins 50 are press-fitted into bores 52 in a radially outwardly projecting annular flange portion 54 of sleeve 30, bores 52 being in register with recesses 56 in first seal element 42 such that as sleeve 30 rotates, pins 50, being keyed to the first seal element 42, cause rotation of seal element 42 therewith. As can be seen, first seal element 42 is essentially held between flange 54 and a snap or retaining ring 58 received in a groove 60 in collar 30. It will thus be seen that, with respect to the rotating seal assembly of the mechanical seal of the present invention, shaft 18, sleeve 30, collar 36, and first seal element 42 are locked together whereby they all rotate relative to housing 12 and gland body 23.

With reference now to the stationary seal portion of the mechanical seal assembly 10, gland body 23 is secured to housing 12 by means of threaded studs 62 that are received in threaded bores 20 of housing 12. Although a fewer number can be employed, generally there are four such studs 62 and four such bores 20. Removably attached to gland body 23 are one or more lugs or brackets shown generally as 64. Each of said lugs 64 (see FIGS. 1 and 2) comprises a first section defining a U-shaped opening 66 formed by spaced apart legs 66a and 66b and a second section forming a generally rectangular tab 68. Tab 68 projects generally perpendicular to legs 66a and 66b.

Again, as can best be seen with reference to FIGS. 1 and 2, gland body 23 is provided with a series of straight slots 70 spaced at generally 90° intervals around and closely adjacent to the periphery of gland body 23. Each of said slots 70 is formed in a second side wall or surface 72 of gland body 23. As can be seen, slot 70 is formed on a milled-out segment 74 of surface 72. Additionally, the peripheral edge 76 of milled-out segment 74 is essentially straight and parallel to slot 70, slot 70 and edge 76 cooperating to form a projecting lip 78. As will be seen hereafter, this projecting/receiving formation interlock formed between gland body 23 and lug 64 allows lug 64 to be easily, but removably, positioned on gland body 23 once gland body 23 has been positioned around the shaft 18.

The biasing or compression spring assemblies of the present invention are best seen with reference to FIGS. 1, 2, and 4. As shown in FIG. 2, there are four such compression spring assemblies, each of which comprises a spring pin 80 secured to gland body 23, spring pin 80 being press-fitted into a bore 82 in wall 72 of gland body 23, each of the four pin assemblies being spaced at 90° intervals around gland body 23. In surrounding relationship to each spring pin 80 is a coil compression spring 84. A retaining clip 86 carried by spring pin 80 serves as a stop against which one end of spring 84 abuts. Each of spring pins 80 extends through a respective bore or slot 88 formed in an annular compression ring 90, bores 88 being spaced and positioned on compression ring 90 so as to be in register with bores 82 formed in gland body 23. A second or stationary seal element 92 is disposed between compression ring 90 and first seal element 42, second seal element 92 forming a second seal face 94 that, as will be seen hereafter, is engageable with first seal face 44 on first, rotating seal element 42. To prevent rotation of stationary seal element 92, compression ring 90 is provided with a plurality of rotation pins or projections 91 that are received in registering bores or recesses 91*a* in stationary seal 92. Like seal element 42, seal element 92 can be made from a variety of materials commonly used in mechanical seal assemblies. Spring 84 is sized such that when spring pin 80 is received through aperture 88 of compression ring 90, spring 84 is compressed between retaining C-clip 86 and compression ring 90. This in turn urges or biases compression ring 90 against second seal element 92, forcing second seal face 94 against first seal face 44.

Spring pin 80 is provided with a second retaining C-clip 96 axially spaced from first retaining C-clip 86. Rotatably received on pin 80 in the space between clips 86 and 96 is a clip 98. Clip 98, as seen in FIG. 2, has a peripheral edge 100. It can be seen with particular reference to FIG. 1 that if seal faces 44 and 94 are pressed together by virtue of moving flange 54 relative to gland body 23 toward collar 36, spring 84 is placed in compression between compression ring 90 and retaining clip 86. This preloads seal faces 44 and 94. If at this point clip 98 is rotated such that it is received in an annular, radially outwardly facing groove 108 formed in collar 36, this preload is retained. In the position shown in FIG. 1, spring 84 is under compression and urges compression ring 90 against second or stationary seal element 92. Because collar 36 is prevented from moving axially away from first seal element 42 because of retaining clip 37 and/or screws 32, seal faces 44 and 94 are thus biased into engagement with one another. Accordingly, the presence of retaining clips 98 received in the groove 108 acts to hold the preload of the stationary seal 92 against the rotating seal 42 and also prevent any relative axial movement between such seals. Furthermore, the clips 98 maintain the components in coaxial relationship to one another. Seal clips 98 are designed to release upon start-up, i.e., on commencement of rotation of shaft 18. In other words, clips 98 will rotate out of engagement with groove 108, thereby minimizing any frictional heat buildup. Additionally, this self-releasing ability of the clips 98 makes them potentially reusable, although, being relatively inexpensive items, should they break during usage, they can be replaced at minimum cost.

The clips 98 are effectively, selectively removable. As noted above, the clips 98 are made of a plastic or some other frangible or wearable material and, because they ride in groove 108, do not have to be moved or rotated out of groove 108 once the seal assembly has been completely installed. Indeed, during operation, it is highly likely and it is contemplated that the clips 98 will wear to the point at which they will simply break off of the spring pins 80. Such a condition is shown in FIG. 4, where the clip 98 is shown as completely missing from the assembly. Alternately, the clips 98 can be rotated out of groove 108 once the seal assembly is installed. In any event, since spring pin 80 is fixedly secured to gland body 23, spring 84 is held in compression between retaining clip 86 and compression ring 90 whereby compression ring 90 acts to bias fixed seal element 92 against rotating seal element 42.

With respect to the spring assemblies, it is to be noted that the compression spring 84 is supported entirely on its inside diameter and is completely unsupported and visible on its outside diameter. Further, spring 84 is positioned radially outwardly from first and second seal elements 42 and 92 and thus is essentially isolated from the process fluid against which the seal assembly 10 is acting. In this regard note that an O-ring 110 is disposed in surrounding relationship to stationary seal 92 and forms a seal between stationary seal 92 and gland body 23. Accordingly, there is formed an annular chamber 112 in surrounding relationship to seal faces 44 and 94. Accordingly, any process fluid leaking between shaft 18 and housing 12 is essentially trapped in chamber 112. This isolation of compression springs 84 from the process fluid ensures that the compression springs 84 will not be subjected, for example, to any corrosive process fluids and particulates that might leak out of chamber 112.

As best seen with reference to FIG. 3, gland body 23 is provided with the port 114, which is in open communication with chamber 112. While in the usual case port 114 is sealed off by a suitable threaded plug, port 114 affords the opportunity to flush chamber 112, and hence the seal faces, with a suitable fluid to effect cleaning of the seal faces or circulate a coolant or to inject a buffer fluid to act against the process fluid.

A particular feature of the mechanical seal of the present invention is the fact that not only are the compression springs 84 readily visible such that clogging, or any corrosion or the like can be readily detected, the unique positioning of compression ring 80 versus gland body 23 allows readily visual inspection of the degree of wear on the seal faces 44, 94. In this regard, by using a suitable feeler gauge, the axial spacing between disk 90 and gland body 23 (shown on X in FIG. 4), and hence the loading on the seal from 44, 94, can be determined. Further, this axial spacing between the compression ring 90 and the gland body 23 can be periodically checked to determine the degree of wear of the seal faces, particularly the stationary seal face 94.

The foregoing disclosure and description of the invention is illustrative and explanatory thereof, and various changes in the size, shape, and materials, as well as in the details of the illustrative construction, may be made within the scope of the appended claims without departing from the spirit of the invention.

What is claimed is:

1. A pre-loaded, cartridge-type mechanical seal for effecting sealing between a rotatable shaft and a wall through which said shaft extends and rotates relative thereto, comprising:

an annular sleeve for securing to said shaft, said sleeve having a first axial end and a second axial end;

a first annular seal assembly carried by said sleeve, said first seal assembly comprising:

a radially outwardly extending flange adjacent said first axial end of said sleeve and rotatable therewith;

a first annular seal element disposed in surrounding relationship to said sleeve and operatively connected to said flange so as to be rotatable in response to rotation of said shaft, said first seal element having a first seal face; and a locking collar adjacent said second axial end of said sleeve for locking said sleeve to said shaft whereby said collar and said sleeve rotate in response to rotation of said shaft;

a second annular seal assembly, comprising:

an annular housing for securing to said wall, said annular housing being releasably secured to said locking collar to permit said locking collar to rotate relative to said housing when said sleeve is secured to said shaft;

a second, annular seal element disposed in surrounding relationship to said sleeve and operatively interconnected to said housing and having a second seal face engageable with said first seal face; and a plurality of compression spring assemblies for biasing said second seal towards said first seal such that said first and second seal faces are in sealing engagement, each of said compression spring assemblies, comprising:

a pin member attached to said housing, said pin member being disposed generally parallel to said sleeve;

a stop member carried by said pin member, said stop member being disposed distal said housing;

a compression ring having a first side operatively engageable with said second seal element and an opposite, second side; and a compression spring disposed in surrounding relationship to said pin member and compressed between said compression ring and said stop member whereby said compression spring serves to bias said second seal element against said first seal element, said compression ring being unsupported on its outside diameter for its entire length, said sleeve, said locking collar, and said first and second seal assemblies comprising a cartridge.

2. The mechanical seal of claim 1 wherein there are four of said compression spring assemblies disposed around said sleeve.

3. The mechanical seal of claim 1 wherein said compression ring includes an aperture through which said pin member extends.

4. The mechanical seal of claim 1 where said compression ring is axially spaced from said housing.

5. The mechanical seal of claim 1 wherein the end of said pin member distal said stop member is received in a bore in said housing.

6. The mechanical seal of claim 1 wherein said first side of said compression ring is in engagement with second seal element.

7. The mechanical seal of claim 1 wherein there is a first resilient seal between said first seal element and said sleeve and a second resilient seal between said second seal element and said housing to thereby define an annular chamber radially outwardly of said first and second seal faces.

8. The mechanical seal of claim 7 including a port in said housing communicating with said annular chamber.

9. A mechanical seal for effecting sealing between a rotatable shaft and a wall through which said shaft extends and rotates relative thereto, comprising:

a rotating seal assembly, comprising:

an annular sleeve for securing to said shaft;

a first, annular seal element carried by said sleeve and rotatable therewith in response to rotation of said shaft, said first seal element having a first seal face; and a stationary seal assembly, comprising:

an annular housing for securing to said wall;

a second, annular seal element interconnected to said housing and having a second seal face engageable with said first seal face;

biasing means for urging at least one of said first or second seal elements toward the other of said first or second seal elements whereby said first and second seal faces are sealingly engaged; and selectively releasable means interconnecting said rotating seal assembly and said stationary seal assembly to restrain relative axial movement between said rotating and stationary seal assemblies prior to securing said housing to said wall and effecting a preload of said biasing means.

10. The mechanical seal of claim 9 wherein said biasing means includes a pin member attached to said housing and disposed generally parallel to said sleeve, a stop member carried by said pin member, said stop member being disposed distal said housing, a compression ring having a first side operatively engageable with said second seal element and an opposite, second side, and a compression spring disposed in surrounding relationship to said pin member and compressed between said compression ring and said stop member whereby said compression ring serves to bias said second seal element against said first seal element.

11. The mechanical seal of claim 10 wherein said selectively releasable means comprises a clip member mounted on said pin member axially outwardly from said compression spring, said rotating seal assembly further including a collar in surrounding relationship to said sleeve and fixed for rotation therewith, said collar including a recess for receiving at least a portion of said clip member.

12. The mechanical seal of claim 11 wherein said recess comprises an annular groove in said collar.

13. The mechanical seal of claim 11 wherein said clip member is comprised of a readily wearable material relative to the material of said collar.

* * * * *